US007383204B2

(12) United States Patent
McCall et al.

(10) Patent No.: US 7,383,204 B2
(45) Date of Patent: Jun. 3, 2008

(54) SYSTEM AND METHOD PROVIDING CUSTOMER INCENTIVE TO PURCHASE NON-FUEL PRODUCTS AND SERVICES

(75) Inventors: Don C. McCall, Cedar Park, TX (US); Dave Embertson, Austin, TX (US); Mike Zahajko, Maple Valley, WA (US); Stephen R. Mixon, Round Rock, TX (US); G. Randy Nicholson, Abilene, TX (US)

(73) Assignee: AutoGas Systems, Inc., Abilene, TX (US)

( * ) Notice: Subject to any disclaimer, the term of this patent is extended or adjusted under 35 U.S.C. 154(b) by 0 days.

(21) Appl. No.: 11/702,866

(22) Filed: Feb. 6, 2007

(65) Prior Publication Data

US 2007/0174126 A1    Jul. 26, 2007

Related U.S. Application Data

(60) Division of application No. 10/679,860, filed on Oct. 6, 2003, now abandoned, which is a division of application No. 09/746,392, filed on Dec. 21, 2000, now abandoned, which is a continuation-in-part of application No. 09/542,178, filed on Apr. 4, 2000, now abandoned, which is a continuation of application No. 09/255,472, filed on Feb. 23, 1999, now Pat. No. 6,321,984, which is a continuation-in-part of application No. 09/026,634, filed on Feb. 20, 1998, now Pat. No. 6,112,981.

(60) Provisional application No. 60/039,007, filed on Feb. 25, 1997.

(51) Int. Cl.
G06Q 30/00 (2006.01)

(52) U.S. Cl. ............................ 705/14; 705/26; 705/27; 235/380; 235/381; 235/382; 235/383

(58) Field of Classification Search .................. 705/14, 705/26, 27; 235/380, 381, 382, 383
See application file for complete search history.

(56) References Cited

U.S. PATENT DOCUMENTS 5,173,851 A * 12/1992 Off et al. ....................... 705/14
5,832,457 A * 11/1998 O'Brien et al. ................ 705/14
5,895,457 A *  4/1999 Kurowski et al. ........... 705/413
6,813,609 B2 * 11/2004 Wilson ......................... 705/14
2005/0261916 A1   11/2005 McCall et al.

FOREIGN PATENT DOCUMENTS

WO      WO 9214213 A1 *  8/1992
WO      WO 9724689 A1 *  7/1997

OTHER PUBLICATIONS

Hisey, "Storming the store Card Gates": Jul. 1997.*

* cited by examiner

*Primary Examiner*—Jean D. Janvier
(74) *Attorney, Agent, or Firm*—Steven W. Smith

(57) ABSTRACT

A system and computer-implemented method of providing an incentive for a customer to purchase non-fuel products or services at a store that sells the products or services and fuel. The system detects that the customer purchased a number of non-fuel products or services in a first visit to the store, and provides the customer with a first reward entitling the customer to a first amount of free fuel. The system then detects that the customer purchased a number of non-fuel products or services in a second visit to the store, and provides the customer with a second reward entitling the customer to a second amount of free fuel. The customer is identified during a subsequent fueling transaction, and the system dispenses an amount of free fuel to the customer equal to the total of the first and second amounts of free fuel.

18 Claims, 10 Drawing Sheets

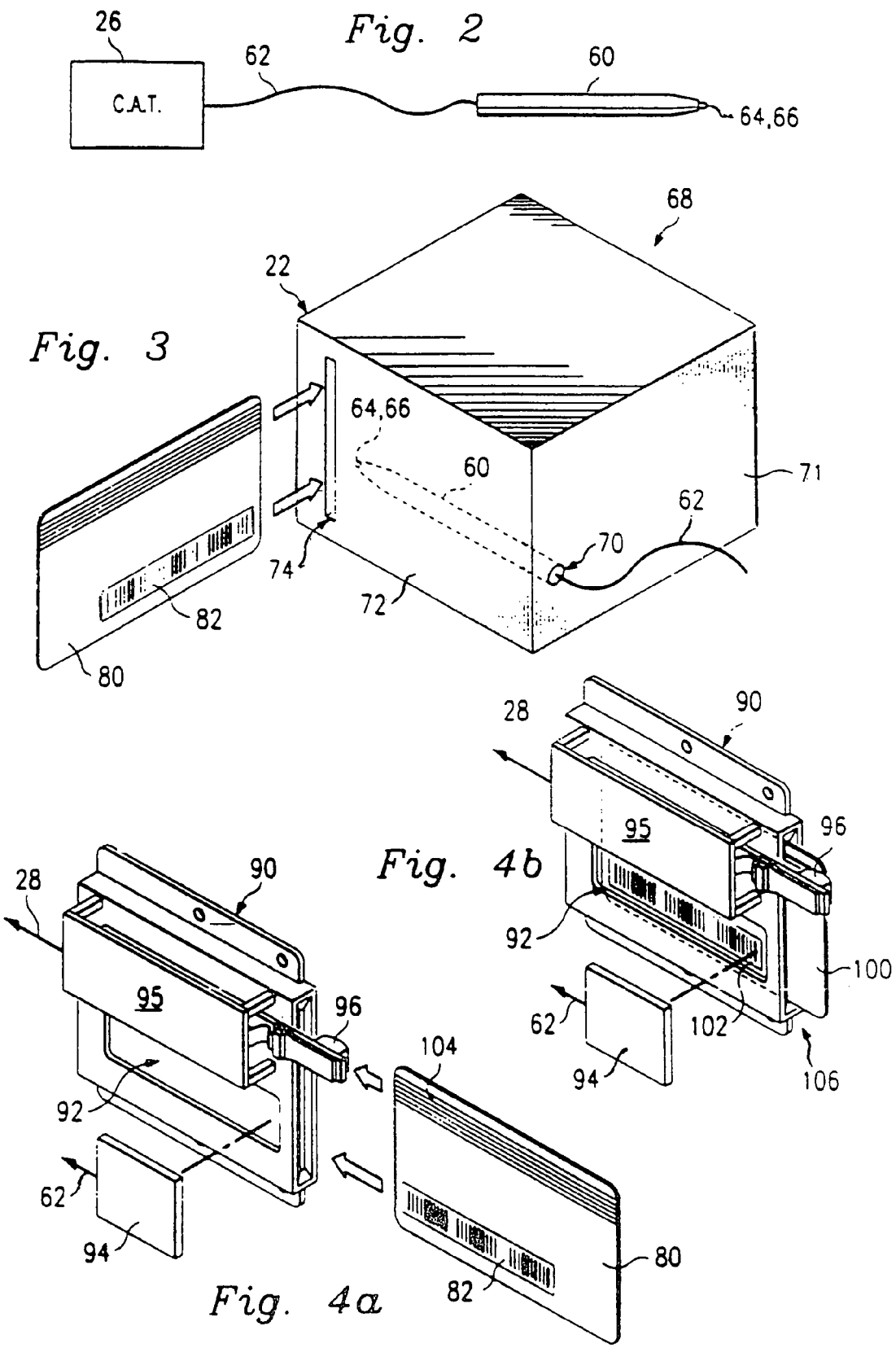

Fig. 9

SMITH, A  ID NO.  1234ABC

| DATE 302 | PURCHASE$ 304 | QUANTITY OF DESIGNATED ITEMS (PROMO) 306 | TOTAL QUANTITY (LOYALTY) 308 | DISCOUNT 310 | DISCOUNT USED 312 | DISCOUNT AMOUNT 314 |
|---|---|---|---|---|---|---|
| 1/5/99 | 20$ | 3 | 5 | N | | |
| 1/17/99 | 15$ | 5 | 10 | Y (≥5 PROMO) | 1/20/99 | 10¢/GAL |
| 1/28/99 | 45$ | 2 | 4 | N | | |
| 2/4/99 | 25$ | 1 | 3 | Y (>20 LOY) Y (>100$) | | 10¢/GAL ⎫ 15¢/GAL ⎭ 25¢/GAL |
| TOTAL | $105 | 11 | 22 | | | |
| | 316 | 318 | 320 | | | |

300 ⟶

208 ⟶

SYSTEM AND METHOD PROVIDING CUSTOMER INCENTIVE TO PURCHASE NON-FUEL PRODUCTS AND SERVICES

RELATED APPLICATIONS

This application is a divisional of U.S. patent application Ser. No. 10/679,860, filed Oct. 6, 2003, now abandoned which is a divisional of U.S. patent application Ser. No. 09/746,392, filed on Dec. 21, 2000 now abandoned, which was a continuation-in-part of U.S. patent application Ser. No. 09/542,178, filed Apr. 4, 2000, now abandoned, which was a continuation of U.S. patent application Ser. No. 09/255,472, filed Feb. 23, 1999, now U.S. Pat. No. 6,321,984, which was a continuation-in-part of U.S. patent application Ser. No. 09/026,634, filed Feb. 20, 1998, now U.S. Pat. No. 6,112,981, which claimed the benefit of U.S. Provisional Application No. 60/039,007, filed Feb. 25, 1997, the disclosures of which are hereby incorporated by reference.

BACKGROUND OF THE INVENTION

This invention relates to automated retail systems and, more particularly, to a system and method for providing an incentive for a customer to purchase non-fuel products or services at a store that sells the products or services and fuel.

Typically, a cash back machine can be used to return unused monies to a consumer that uses a bill accepting device or magnetic card reader to pay for fuel. However, cash back machines are costly. Furthermore, using cash back machines to return unused monies to consumers do not increase consumer loyalty.

The present invention is directed to overcoming one or more of the limitations of systems for purchasing fuel.

SUMMARY OF THE INVENTION

In one aspect, the present invention is directed to a computer-implemented method of providing an incentive for a customer to purchase non-fuel products or services at a store that sells the products or services and fuel. The method includes the steps of detecting that the customer purchased a number of non-fuel products or services in a first visit to the store; providing the customer with a first reward entitling the customer to a first amount of free fuel in exchange for purchasing the non-fuel products or services in the first visit; detecting that the customer purchased a number of non-fuel products or services in a second visit to the store; and providing the customer with a second reward entitling the customer to a second amount of free fuel in exchange for purchasing the non-fuel products or services in the second visit. The method also includes identifying the customer during a subsequent fueling transaction; and dispensing an amount of free fuel to the customer equal to the total of the first and second amounts of free fuel.

In another aspect, the present invention is directed to a system for providing an incentive for a customer to purchase non-fuel products or services at a store that sells the products or services and fuel. The system includes means for detecting that the customer purchased a number of non-fuel products or services in a first visit to the store, and that the customer purchased a number of non-fuel products or services in a second visit to the store; and means for providing the customer with a first reward entitling the customer to a first amount of free fuel in exchange for purchasing the non-fuel products or services in the first visit, and for providing the customer with a second reward entitling the customer to a second amount of free fuel in exchange for purchasing the non-fuel products or services in the second visit. The system also includes means for identifying the customer during a subsequent fueling transaction; and means for dispensing an amount of free fuel to the customer equal to the total of the first and second amounts of free fuel.

In yet another aspect, the present invention is directed to a computer-implemented method of providing an incentive for a customer to purchase non-fuel products or services at a retail store. The method includes the steps of detecting that the customer purchased a number of non-fuel products or services in a first visit to the store; providing the customer with a first reward entitling the customer to a first amount of free fuel in exchange for purchasing the non-fuel products or services in the first visit; detecting that the customer purchased a number of non-fuel products or services in a second visit to the store; and providing the customer with a second reward entitling the customer to a second amount of free fuel in exchange for purchasing the non-fuel products or services in the second visit. The method also includes identifying the customer during a subsequent fueling transaction at a fueling station having a cross-marketing agreement with the retail store; and dispensing by the fueling station, an amount of free fuel to the customer equal to the total of the first and second amounts of free fuel.

In yet another aspect, the present invention is directed to a computer-implemented method of providing an incentive for a customer to purchase non-fuel products or services at a plurality of retail stores. The method includes the steps of detecting that the customer purchased a number of non-fuel products or services in a visit to a first retail store; providing the customer with a first reward entitling the customer to a first amount of free fuel in exchange for purchasing the non-fuel products or services in the visit to the first retail store; detecting that the customer purchased a number of non-fuel products or services in a visit to a second retail store; and providing the customer with a second reward entitling the customer to a second amount of free fuel in exchange for purchasing the non-fuel products or services in the visit to the second retail store. The method also includes storing the first and second rewards in a rewards database; identifying the customer during a subsequent fueling transaction at a fueling station having a cross-marketing agreement with the first and second retail stores; retrieving the first and second rewards from the rewards database; and dispensing by the fueling station, an amount of free fuel to the customer equal to the total of the first and second amounts of free fuel.

BRIEF DESCRIPTION OF THE DRAWINGS

FIG. 2 is a diagram of a bar code wand used in the fuel dispenser system of FIG. 1.

FIG. 3 is a diagram of a card reader device used in the fuel dispenser system of FIG. 1.

FIGS. 4a and 4b are diagrams of another card reader device used in the fuel dispenser system of FIG. 1.

FIG. 9 is an example of a record that could be used to track customer eligibility for fuel discount rewards in accordance with the present embodiments.

DETAILED DESCRIPTION

Figure 1:
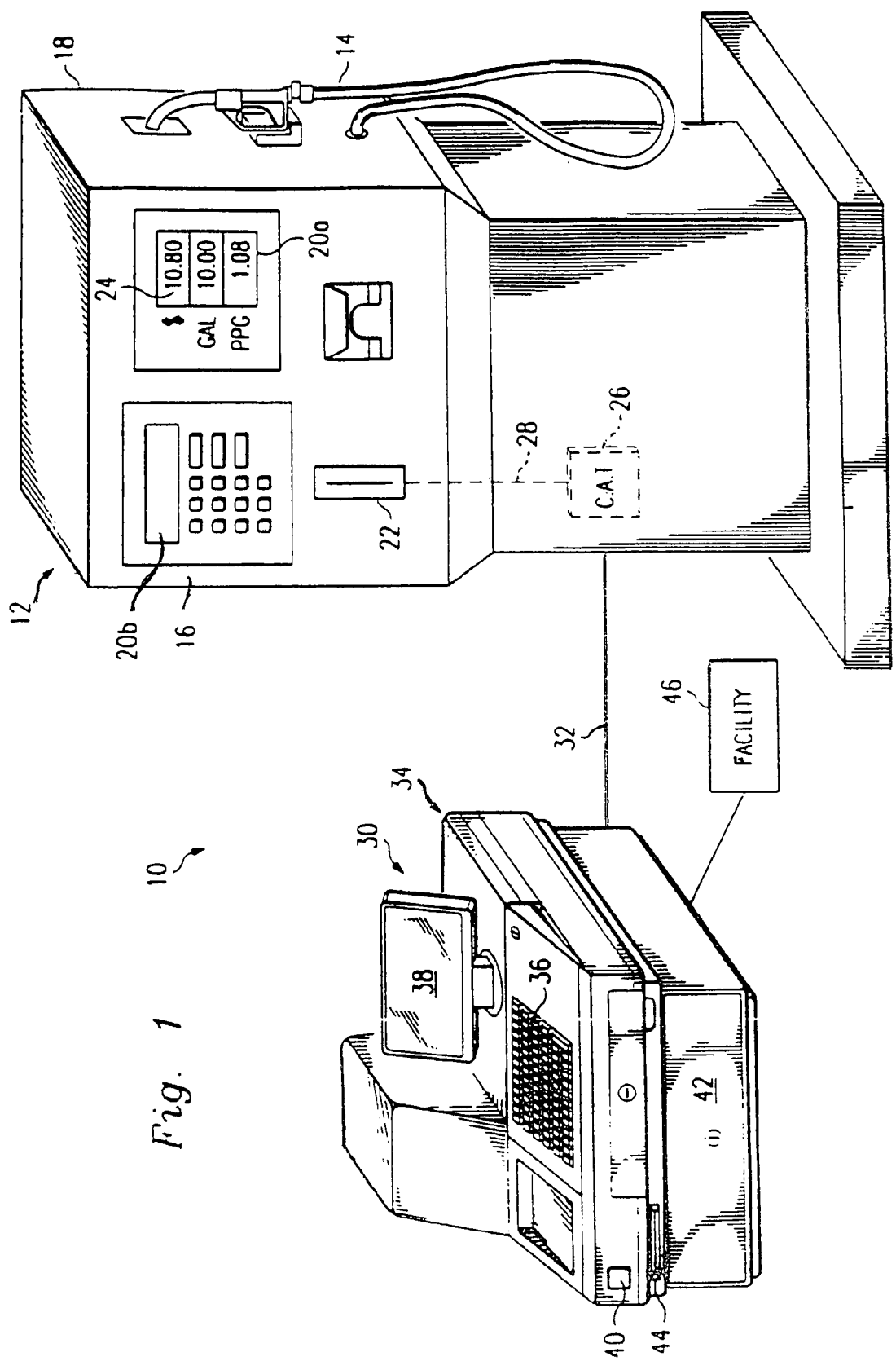
FIG. 1 is a diagram of an embodiment of a fuel dispenser system.

In FIG. 1, the reference numeral 10 designates a fuel dispenser system embodying features of one embodiment of the present invention. The fuel dispenser system 10 includes a fuel dispenser 12, which contains many elements of a conventional fuel dispenser such as a fuel nozzle 14 connected to a fuel supply (not shown). The dispenser 12 has a front side 16 and a back side 18. In the following description, only the front side 16 will be discussed for ease of description. However, the features described herein may also be applied on the back side 18, thereby allowing the dispenser to be operated by two customers at the same time.

The front side 16 houses conventional graphics displays 20a, 20b and a reader device 22 embodying features of the present invention. The graphics displays 20a, 20b each include a large, conventional, LCD panel for showing text and numerals, such as a price 24 that corresponds to an amount of fuel dispensed, or other customer-related messages. The reader device 22 includes magnetic strip reading circuitry connected to a controller 26 through a cable 28 such as an RS232 serial data bus. For the sake of example, the controller 26 controls the reader device 22 as well as other functions of the dispenser 12, such as a controller that includes a Customer Activated Terminal ("CAT") computer produced by the Wayne Division of Dresser Industries. Both the controller 26 and the cable 28 are conventional devices housed inside the dispenser 12. It is understood that the reader device 22 and controller 26 continue to provide conventional magnetic strip reading functions in addition to the functions and features herein described.

The controller 26 is also connected to a computing center 30 through a bus 32. In one embodiment, the computing center 30 is remotely located inside a store (not shown) or at an unattended site where it may be readily accessed. The computing center 30 includes a point-of-sale ("POS") controller 34. The POS controller 34 includes many features of a conventional electronic cash register, such as a keyboard 36, a display 38, a database 40, a cash drawer 42, and an internal card reader device 44, for use by an operator in charge of overseeing and maintaining the dispenser system 10. It is understood that the database 40 may be remote, and is shown with the POS 34 for ease of description. Also, the POS controller 34 may be in communication with other systems or devices, such as a carwash facility 46.

The database 40 contains a collection of records pertaining to its customers. For example, the store may be a member-oriented retail outlet, and a record for each customer indicates that the customer is a member and a "level" of benefits or privileges that the customer may receive. One level may indicate a first discount to the customer of the goods he purchases while another level may indicate a second discount. The POS controller 34 can thereby receive information from the controller 26, access the database 40, and return control codes which indicate, for example, membership status, level of benefits, or an "OK" signal to allow fuel dispensing.

Referring to FIG. 2, the controller 26 is also connected to one end of a bar code detector 60 with a second cable 62. The bar code detector 60 is a standard, decoded-type hand-held stationary beam bar code reader such as the Welsh Allyn model Scanteam ST6180 reader. The bar code detector 60 also includes, at the end opposite the second cable 62, a photo detector 64 and a light source 66. The photo detector 64 may be a photo cell, photo diode or photo transistor, while the light source 66 may be a light emitting diode.

Referring to FIG. 3, the reader device 22 is surrounded by a housing 68 and a hole 70 is established on a side face 71 of the housing near a front face 72. The hole 70 extends to a slot 74 used for receiving cards such as debit/credit cards, but is separated from the slot by a small plastic or glass window (not shown). As a result, the hole 70 does not interfere with any pre-existing circuitry of the reader device 22. The hole 70 is also of sufficient size for viewing one bit of bar coded data at a time. The bar code detector 60 is inserted into the reader device 22 through the hole 70 so that the end with the cable 62 hangs out of the hole. In this way, the photo detector 64 is installed behind the small window and may access cards slid into and out-of the slot 74.

In operation, the reader device 22 receives a bar coded card 80. As the bar coded card 80 is slid into the slot 74, light from the light source 66 reflects off the bar coded card 80 so that the photo detector 64 can sequentially read bits of optical (bar coded) data 82 stored on the card. The bar code detector 60 interprets the bar coded data 82 and coverts it into ASCII data, which it transmits to the controller 26, FIG. 1, through the cable 62. Firmware in the controller 26 detects the presence of the ASCII data and processes it into electronic data, a method similar to that used to process magnetic strip cards. The controller 26 then transmits the electronic data to the POS controller 34 through the bus 32. The POS controller 34 uses the electronic data in order to secure payment in accordance with the data, such as by forwarding the electronic data to a credit card processing network (not shown) for authorization and/or charging the sale to an account associated with the electronic data. The POS controller 34 then returns one or more control codes that direct the controller 26 to allow fuel to dispense and potentially, to indicate any discounts to be provided.

In another embodiment, FIGS. 1 and 2, the bar coded data 82 is processed by the POS controller 34 and a local billing file is established for billing the customer later. It is also possible for the POS controller 34 to have a local negative file of all invalid account numbers or a local positive file of all valid card numbers. In such cases the electronic data could be kept and billed locally, or forwarded in "batches" to another computer on-site or off-site for billing. The electronic data provided by the bar code detector 60 can also be differentiated from electronic data conventionally read from a magnetic strip card by the reader 22. This differentiation may, for example, be used for frequent shopper tracking and awards, or for providing a price discount, described in greater detail below.

Referring to FIGS. 4a and 4b, in another embodiment, a reader device 90 is used in place of the reader device 22 (FIG. 3). Instead of having the roundish hole 70 for the wand of the bar code detector 60, the reader device 90 includes a rectangular-shaped window 92 for simultaneously viewing all of the bar coded data. The window 92 allows a scanning bar code reader 94, such as Symbol model LS1220-1300A produced by Symbol Technologies, Inc., to read the bar coded data 82 on the card 80. The scanning bar code reader 94 has many of the same components as the bar code detector 60, but is advantageous because it moves its light source (not shown) in multiple directions, thereby increasing its ability to read bar coded data. Also, as is the case for the reader device 22 of FIG. 3, the reader device 90 includes conventional magnetic strip circuitry 95 and a magnetic strip reader 96 to read conventional magnetic strip data.

In operation, the reader device 90 receives the card 80. The card 80 has the bar coded data 82 and may also include magnetic strip data 104 stored thereon. The reader device 90 reads the magnetic strip data 104 in a conventional manner with the magnetic strip reader 96 and reports it to the controller 26 through the cable 28, as is done in the device 22 (FIG. 3). To read the bar coded data 82, the card 80 is slid into a slot 106 of the device 90 until the bar coded data 82 is fully exposed in the window 92. Light from the light source of the scanning bar code reader 94 reflects off the bar coded data 82, thereby allowing the reader to read the data. The scanning bar code reader 94 interprets the bar coded data 82 and coverts it into ASCII data, which it then transmits to the controller 26 through the cable 62. Firmware in the controller 26 detects the presence of the ASCII data and processes it into electronic data, a method similar to that used to process magnetic strip cards and described with reference to FIG. 3, above. It is understood that different combinations of bar coded and magnetic strip data are expected, and the card 80 is meant to illustrate only some of the combinations. In typical operation, a successful product scan is acknowledged by an audiovisual signal by connection to the POS controller 26.

A benefit of the modified reader devices 22, 90 is that their modification can be done very easily, while maintaining full functionality of the remaining components. Also, the modification can be sold as a kit to simply replace the previous, conventional magnetic-strip-only reader devices with the improved devices 22, 90. Other modifications can easily be supported, such as using a single cable instead of two cables 28, 62, or sharing some or all of the circuitry 95 for use in bar coded and magnetic data interpretation.

Figure 5:
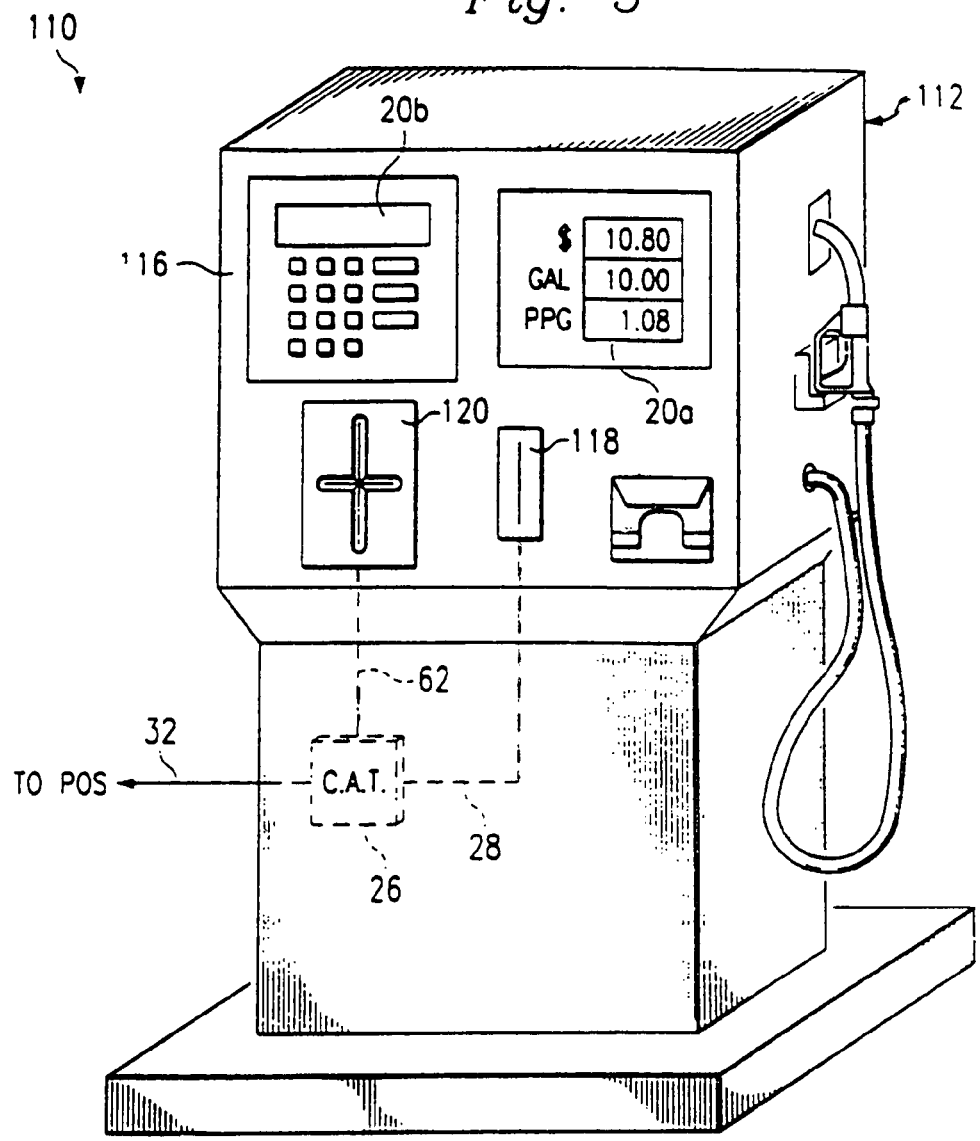
FIG. 5 is a diagram of another embodiment of a fuel dispenser system.

Referring to FIG. 5, the reference numeral 110 refers to a fuel dispenser system embodying features of another embodiment of the present invention. The fuel dispenser system 110 contains a fuel dispenser 112 connected to the computing center 30 and many components similar to those in the fuel dispenser system 10 (FIG. 1), such components being similarly numbered.

A front side 116 houses the conventional graphics displays 20a, 20b and (optionally) a conventional magnetic-strip-only reader device 118. The front side 116 also houses a scanning bar code reader 120. The magnetic strip reader device 118 and scanning bar code reader 120 are connected to the controller 26 through cables 28, 62 respectively. The scanning bar code reader 120 is similar to the reader 94 (FIGS. 4a, 4b) in that it moves its light source (not shown) in multiple directions, thereby increasing its ability to read bar coded data. By being placed directly on the front side 116, the scanning bar code reader 120 realizes several additional benefits discussed in greater detail, below.

In operation, the bar coded card 80, discussed above, may simply be placed or waved in front of the scanning bar code reader 120. At this time, light from the light source projected from the scanning bar code reader 120 reflects off the bar coded card 80 so that a photo detector (also not shown) can read the bar coded data 82. The scanning bar code reader 120 interprets the bar coded data 82 and converts it into ASCII data (or data in any other suitable format), which it transmits to the controller 26 through the cable 62. Firmware in the controller 26 detects the presence of the data and processes it into electronic data, a method similar to that used with the bar code reader 60 and described with reference to FIG. 3, above.

Figure 6:
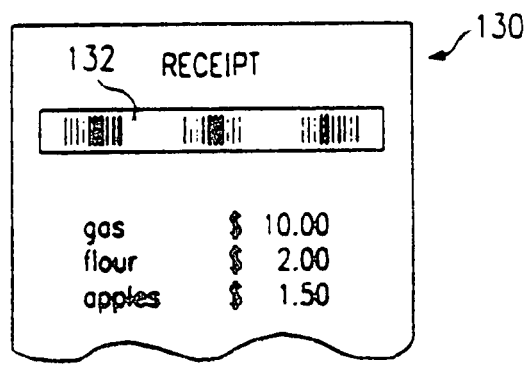
FIG. 6 is an illustration of a receipt used in the fuel dispenser system of FIG. 5.

Referring to FIG. 6, another benefit provided by the scanning bar code reader 120 is that it can read bar coded data from items other than bar coded cards. The reference numeral 130 designates a paper receipt with bar coded data 132 printed thereon. The receipt 130 may also be placed or waved in front of the scanning bar code reader 120, as described above with reference to FIG. 5.

Figure 7:
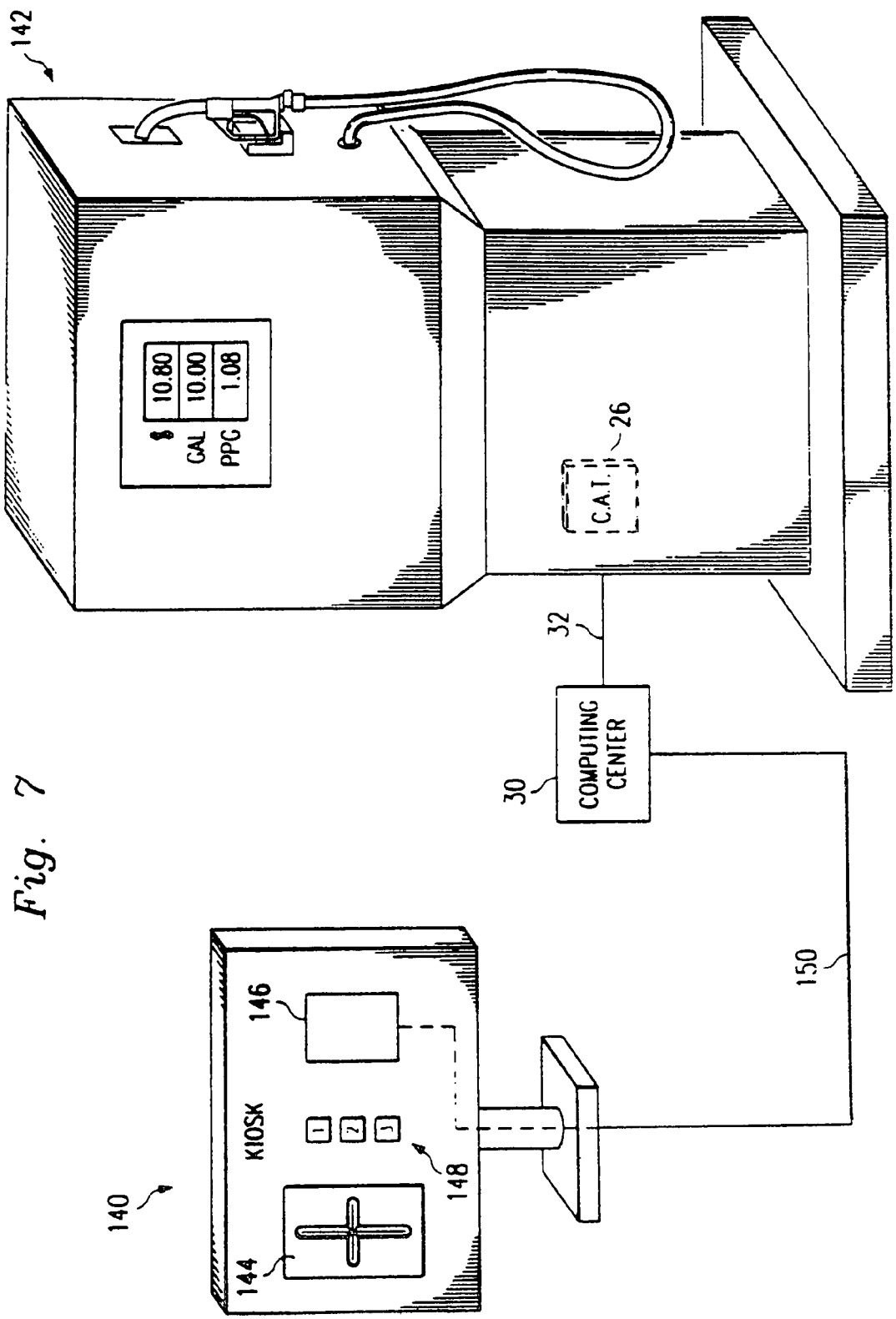
FIG. 7 is a diagram of a kiosk used with a conventional fuel dispenser system for implementing features of the present invention.

Referring to FIG. 7, in another embodiment, a separate system, such as a kiosk 140, may be provided to interface with one or more conventional fuel dispensers 142. The kiosk 140 includes a scanning bar code reader 144, a display screen 146, and a keypad 148. The kiosk 140 is in communication with the computing center 30, discussed above, which in turn is in communication with the controller 26 of the conventional dispenser 142. By using the kiosk 140, the features of the present invention may be achieved without physically modifying the fuel dispenser system 142.

Listed below are several examples of how the fuel dispenser systems described above may be used. It is understood that the functionality described below is interchangeable with the different systems, and is not meant to be an exhaustive list.

EXAMPLE A (FIGS. 5-6)

1. A customer enters a store and purchases, among other things, $10 worth of gasoline.
2. The store gives the customer a receipt (similar to the receipt 130) which includes a description of the purchases and bar coded data (similar to bar coded data 132) indicating the prepaid $10 amount.
3. The customer places the receipt in front of the scanning bar code reader 120 and then operates the fuel dispenser 110 to dispense $10 worth of gas.

EXAMPLE B (FIGS. 5-6)

1. A customer enters a store and purchases several items.
2. The store, which has a reward program that gives free gasoline, gives the customer a receipt (similar to the receipt 130) having bar coded data (similar to bar coded data 132) indicating a free $1 worth of gasoline.
3. The customer collects four more receipts over several visits to the store, each indicating a free $1 worth of gasoline.
4. The customer sequentially places the five receipts in front of the scanning bar code reader 120, and then operates the fuel dispenser 110 to dispense $5 worth of gas.
5. The customer also inserts a magnetic strip credit card into the magnetic strip reader device 118 to allow an additional amount of gasoline to be dispensed. A charge for the additional amount is reported to a credit agency identified by the magnetic strip credit card.

EXAMPLE C (FIG. 7)

1. A customer obtains a bar coded card (similar to the card 80) indicating a "member" status (e.g., the customer is eligible for certain benefits).

2. The customer places the card near the scanning bar code reader 144 of the kiosk 140. The card identifies an account and an appropriate benefit (e.g., a 10.cent. per gallon discount).

3. The customer enters on the keypad 148 a number identifying the fuel dispenser 142.

4. The customer operates the fuel dispenser 142 to dispense gasoline and the account is credited for the purchase (adjusted by the 10.cent. per gallon discount).

EXAMPLE D (FIGS. 1-3)

1. A customer obtains a bar coded card (similar to the card 80) which identifies a first account for a store and a conventional magnetic strip credit card which identifies a second account with a bank.

2. The customer approaches the fuel dispenser 12 associated with the store and places the bar coded card into the reader 22.

3. The customer then places the magnetic strip credit card into the reader 22.

4. The customer operates the fuel dispenser 12 to dispense gasoline and the second account is credited for the purchase.

5. The store records a data record in the first account of the customer's fuel purchase.

6. Steps 2-5, above, are repeated four more times.

7. The fuel dispenser 12 displays on the screen 20b a message:

BECAUSE YOU HAVE PURCHASED FUEL
HERE FIVE TIMES IN THE LAST THIRTY
DAYS, YOU MAY HAVE A COMPLIMENTARY
CAR WASH and provides the customer with a predetermined number.

8. The customer drives to the nearby carwash facility 46 and enters the predetermined number on an attached keypad (not shown).

9. The carwash facility 46 interprets the predetermined number to identify that the customer has a complimentary carwash and performs the carwash service.

It should be noted that the carwash facility 46 described in Example D above may also have a bar code reader connected to the computing center 30. In this way, the carwash facility 46 may provide similar functions as those described above with the reader 22. Also, the carwash facility 46 and fuel dispenser 12 may be in communication so that instead of providing a predetermined number, a record associated with the bar coded card is stored indicating the complimentary carwash.

Figure 8:
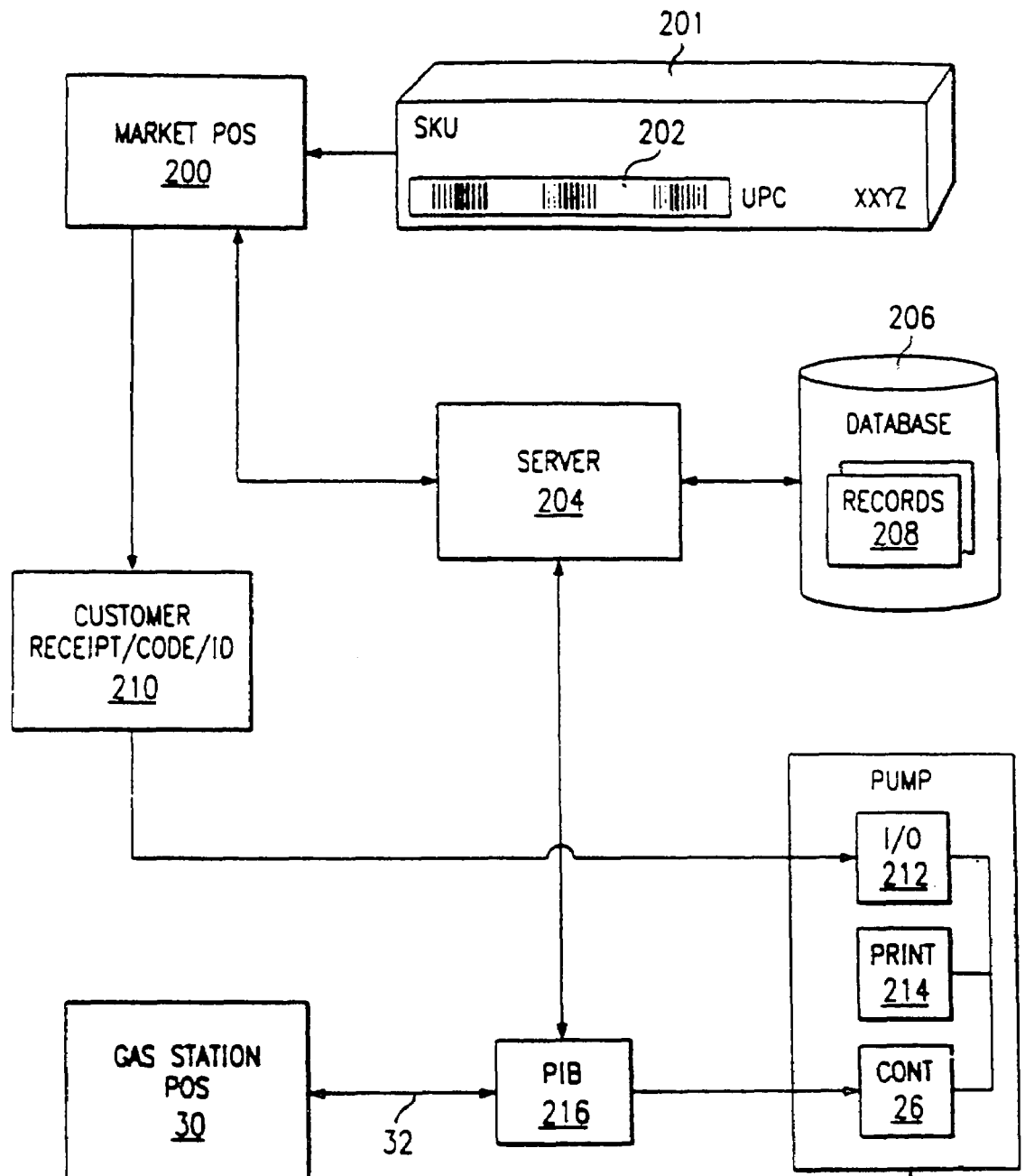
FIG. 8 is a block diagram of the components that can be utilized to implement the present embodiments which integrates a customer reward system with an fuel dispenser having a dynamically adjustable price.

Referring to FIG. 8, a block diagram of the components included in a preferred embodiment are shown and will now be described. A market point of sale (POS) terminal 200 is shown that may be located in a retail store, or the like. For example a Wal-Mart store is one type of retail outlet that may include a POS 200 in accordance with the present invention. Reference numeral 201 represents an item to be purchased by a customer in the retail store including POS 200. It is the usual case that each item will include stock keeping unit (SKU) number, as well as a Universal Purchase Code (UPC) that is provided as an optically scannable bar code 202. When purchasing the item 201, a customer will present the item at POS 200 where it will be scanned in or otherwise entered.

A server data processing system 204 is shown and coupled with POS 200. Server 204 may be a commercially available workstation computer from one of the various computer manufacturers, such as Compaq Computer, IBM Corporation, Hewlett Packard, or the like. A database 206 is linked to server 204 and includes multiple records 208 that correspond to customers purchasing items through POS 200. It should be noted that many POS terminals 200 are contemplated as being connected to server 204 and may be distributed remotely across more than one store. Server 204 will include software that manages the transactions occurring on POS 200, as well as the records 208 in database 206. In a preferred embodiment, database 206 may be magnetic storage media, optical storage or the like.

Upon completion of a purchase transaction at POS 200, the customer (if eligible) will be provided with a mechanism 210 that will allow discounted fuel to be purchased at pump 112. That is a receipt, such as receipt 130 having a bar code 132 thereon may be provided to the customer. Additionally, a card with a magnetic stripe may be updated by POS 200 with information authorizing a fuel discount. Further, an identification code may be provided to the customer which can then be entered on a keypad included in the pump input/output I/O device 212. It will be understood that I/O device 212 may also include a magnetic card reader 118, bar code reader 120, or the like. Pump 112 also includes controller 26 that is electrically coupled to server 204 and printer 214. Controller 26 includes a microcontroller that processes and controls the various activity at pump 112. Peripheral interface board (PIB) 216 or other device is included in a preferred embodiment to provide an interface between server 204 and controller 26. PIB 216 allows the control signal output by server 204 to be interpreted by controller 26. That is, PIB 216 receives the control signal from server 204 with the authorization code and the unit price discount offered to the customer. Interface board 216 will then issue an command to controller 26 to map the discount amount to each of the fueling point product select positions, i.e. regular, premium, etc. In one example, the discount value range may be encoded as an eight bit value to give 256 different discount amounts. In this manner, the server 204 will be able to authorize a price discount, PIB 216 will then issue a command compatible with controller 26 to cause pump 112 to dispense fuel at the discounted unit price.

It should be noted that while a single retail store and corresponding fuel dispensing facility have been shown in FIG. 8 and described above, the present invention contemplates the situation where an entire chain of stores or related stores may be interconnected such that any one of their POS terminals can be connected to a server through a network. Further, numerous fuel stations can also be coupled to a server to allow discounted fuel in response to customer purchases at one of the associated stores. For example, Wal-Mart and Starbucks may form an alliance such that purchases from one or the other (or both) stores can cause fuel discounts to be made available. A POS terminal in either store can be coupled to a server that maintains customer records. Also, fuel companies can also form alliances such that Texaco and Mobil can have their pump controllers connected to the same server. In this manner a customer may be entitled to fuel at a reduced unit cost based on purchases made at any Wal-Mart or Starbucks store nationwide, and be able to redeem that discount at any Texaco or Mobil station independent of geographic location. Further, it can be seen that with the Internet it is possible to connect virtually any retailer wishing to offer discounted fuel based on predefined purchase criteria with virtually any fuel station without geographic boundary. Discounts may also be offered for purchase of items other than fuel, such as in the case of a POS 30, discussed above, located at a convenience store or other retailer.

FIG. 9 is a more detailed view of the fields that may be included in record 208 corresponding to a particular customer, e.g. A. Smith. As shown in field 300 of FIG. 9, the customer name is provided along with an identification number. For new customers, or when the system of the present invention is first installed, a record will be created when the first item is purchased at POS 200.

The date of purchase when at least one item was purchased at POS 200 of an associated retailer is provided in field 302. The dollar value of the purchases is listed in field 304. Retailers may often designate various items to trigger discounts related to competing or related items. The quantity of these designated, or trigger items, that were purchased on each date (if any) are provided in field 306. As an example of a trigger item, a certain brand of baby formula may be purchased which will cause a coupon to be generated for a competing baby formula. Also, complementary items may be used as trigger items. That is, the purchase of cereal may trigger a coupon for a discount on milk.

Field 308 is the total quantity of items purchased by a certain customer on a specific date. This field, along with field 304 can be used as a criterion for determining customer loyalty. Field 310 will include data representing the availability of a fuel discount. The record will be updated in field 312 when a discount is actually used by a customer and the discount amount is provided in field 314. Fields 316, 318 and 320 provide totals for the dollar value fields 304, designated items purchased 306 and total quantity 308, respectively.

As an example, when A. Smith purchases $20 of merchandise on Jan. 5, 1999, record 208 is created by server 204 and stored in database 206. At that time three (3) designated items were purchased out of a total quantity of five (5) items. These purchases did not meet the established criteria that would cause a discount on fuel to be made available.

Then, on Jan. 17, 1999, A. Smith purchased five designated items, 10 total items for $15.00. This purchase will cause the total designated item purchase by this customer to exceed five and cause a fuel discount to be offered. Thus, field 310 will indicate that a fuel discount was offered to A. Smith on Jan. 17, 1999. The discount amount is noted as $0.10 per gallon in field 314. As noted above, the mechanism by which the discount is offered may be a receipt with a bar code, updated magnetic card, alphanumeric authorization code, or the like.

Further, record 208 shows that this customer took advantage of the discount and used it to purchase fuel on Jan. 20, 1999. It will be understood that this data can then be analyzed to determine the success of the discount program. That is, the predefined purchase criteria can be adjusted as needed to provide the discount for different items, different quantities of the items or a different discount amount.

Returning to the current example, A. Smith returns to the associated store and purchases additional items on Jan. 28, 1999, totaling $45.00. However, at this time A. Smith has not reached the next purchasing criteria threshold that will cause discounted fuel to be offered.

On Feb. 4, 1999, A. Smith once again purchases items from this, or another participating store. This purchase causes the total purchases to exceed $100.00. Also, A. Smith purchased three total items that caused the total quantity of merchandise purchased at this store to be greater than 20 items. In this example, exceeding both of these criteria will trigger a fuel discount. That is, purchasing greater than 20 items within a month will cause a $0.10 fuel discount to be offered and exceeding $100.00 in total purchase price will cause a $0.15 fuel discount. Those skilled in the art will understand that the fuel discount system of the present invention can be designed to offer the highest discount of the two, e.g. $0.15 per gallon, the lowest discount $0.10, an average of the two, or add the discounts and offer a $0.25 per gallon discount to the customer. In any event, it can be seen that information provided in a record 208 can be used to monitor a customers status relative to being offered discounted fuel and to determine when such offer is to be made to the customer.

Of course, those skilled in the art will appreciate that many other types of data may be used in addition to, or instead of the various information discussed as an example with regard to FIG. 9. And, it should be understood that the scope of the present invention contemplates such additional information.

Figure 10:
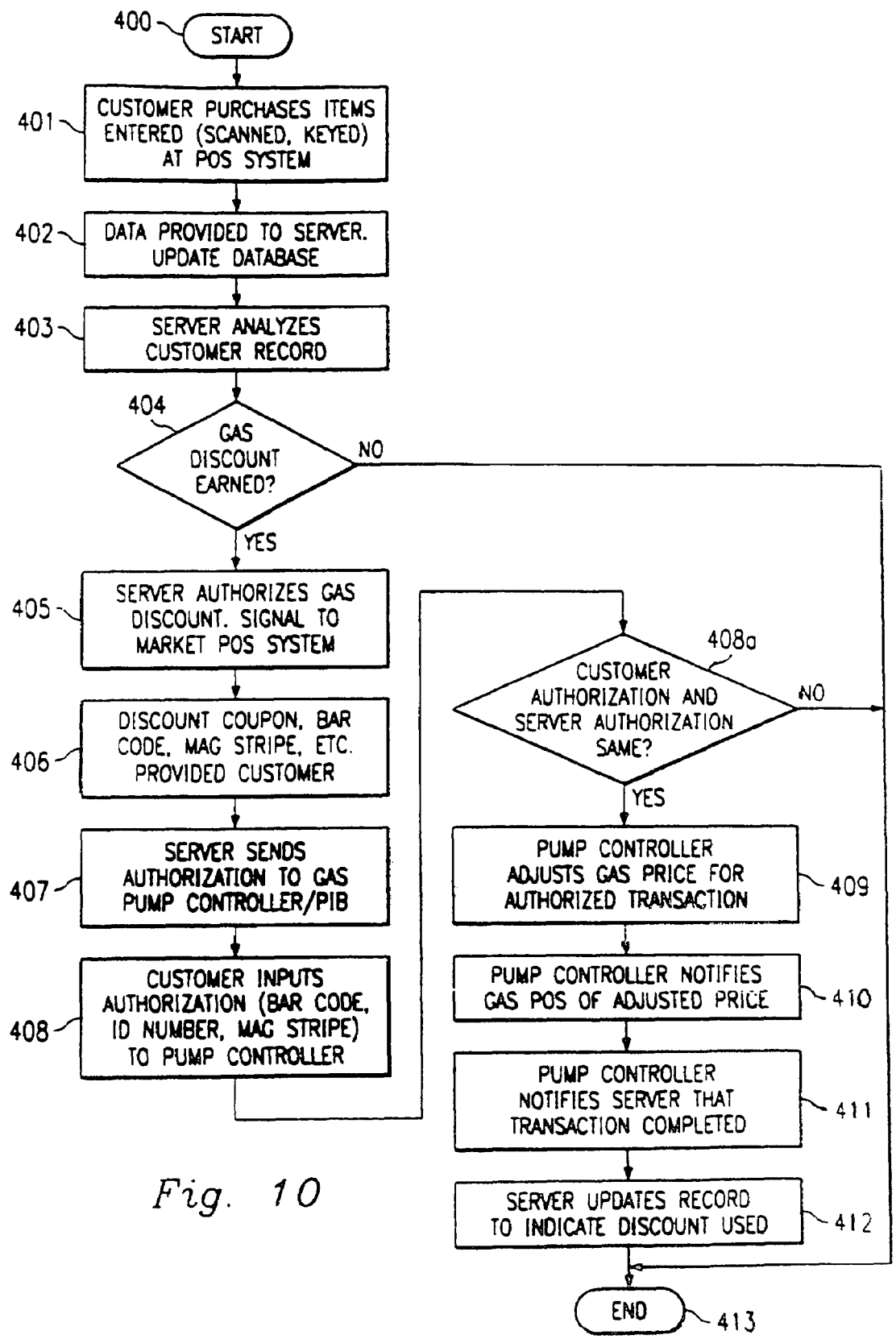
FIG. 10 is a flowchart of the process implemented by the present embodiments to encourage customer loyalty by providing discounter fuel based on predefined purchase criteria.

FIG. 10 is a flowchart showing the process implemented by the present embodiments to cause fuel discounts to be made available to eligible customers.

At step 400 the process is started and the customer purchases items at step 401 where the identification code for the purchased items is entered at POS 200. The customer identity is also entered by using a member club card, personal identification number (PIN), or the like, such that an associated record can be created or updated. The data relating to the purchased items is then provided by POS 200 to server 204, at step 402. Server 204 then analyzes the customer record (step 403). That is, server 204 will create a record for a new customer or maintain an existing record by updating it with current purchases for customers already having a record.

At step 404 a determination is made as to whether the current purchases will cause a fuel discount to be offered. As noted above this step may include determining if the customer has purchased certain designated items that will trigger a discount, whether a total dollar value spent exceeds a predefined threshold and/or if a total quantity of items exceeds a threshold.

If at step 404 it is determined that the customer has not yet earned a fuel discount, then the method proceeds to step 413 and ends. However, if at step 404 it is determined that a fuel discount is available, then at step 405 the server authorizes the discount and sends a signal to the market POS termination 200. At step 406, a bar coded discount coupon, alphanumeric authorization code, updated magnetic card or other mechanism is provided to the customer. At step 407, server 204 sends an authorization signal to PIB 216, which then provides corresponding commands to controller 26 in pump 112. The signal from server 204 will include an authorization code and a discount amount. The customer then inputs the fuel discount authorization code from POS 200 at pump 112 in step 408. More particularly, the customer may swipe a magnetic card, scan in a bar code from a receipt of key in an alphanumeric code at I/O 212 of pump 112. After the customer authorization code is entered the process then compares (step 408a) the authorization code from server 204 with the code from the customer and if a match exists then proceeds to step 409 and adjusts the price of the fuel to be dispensed for this transaction. However, if a match does not occur at step 408a, then an error has occurred or an unauthorized customer is attempting to obtain discounted fuel. When no match occurs the process continues to step 413 and ends without allowing discounted fuel to be dispensed. Of course, those skilled in the art will understand that it is possible to send a notification signal to server 204, gas station POS 34 or another terminal when a match does not occur to indicate a potentially fraudulent user may be attempting to obtain discounted fuel.

At step 410, pump controller 26 notifies gas station POS 34 of the adjusted fuel price such that the fuel sales records will be in order and to ensure that the customer is correctly charged the discounted fuel price. Next, at step 411 pump controller 26 notifies server 204 of completion of the transaction for discounted fuel and readjusts the fuel price to its normal level by mapping the discount amount to zero. Server 204 then updates the customer record 208 in database 206 to reflect that the discount was used. Subsequent to step 412, the process of the present embodiment continues to step 413 and ends.

Of course, many other configurations are contemplated by the present embodiment. For example, gas station POS 34 can also be a source of discounted gas. That is, POS 34 may be in a convenience store that also desires to develop customer loyalty by providing fuel discounts. In this scenario, a customer may purchase a certain volume of gas or other items such as candy bars and coffee which triggers a discount in the price of fuel. Authorization can then be provided directly to PIB 216 from POS 34 to adjust the unit price of fuel dispensed from pump 112. Additionally, the authorization could be sent to server 204 to update or create customer record 208.

Further, the purchase of fuel at full price could also be used to trigger discounts on items in the retail store having POS 200. For example, when a customer purchases fuel a signal can be sent from controller 26 to PIB 216 to server 204 which then updates and analyzes the customer's record (or creates a record if none exists). If the customer has purchased fuel in excess of a predetermined value (dollar) or quantity (gallons) threshold, then a signal can be sent from server 204 back to controller 26 via PIB 216, to authorize a discount for this customer on merchandise to be purchased at a participating store. More particularly, a bar coded receipt can be printed by printer 214 that the customer can then take to the participating store and redeem for a discount on one or more items purchased as POS 200. When purchased a signal will be sent to server 204 and the customer record will be updated accordingly.

Other arrangements are also contemplated to implement discounts at the fuel dispensing system or associated store. For example, the mechanism 210 may not be needed if other means are provided to identify the customer at either the market POS 200 or the POS 30. In one example, a customer card or number used at the market POS 200 may similarly be used at the gas station POS 30 such that the customer's discount can be automatically applied at the POS 30. Identification may also be accomplished by an initial registration procedure whereby a customer card/number may be matched with the credit or debit account of the customer that the customer utilizes to make purchases at the POS 30. In one example, transponder technology may be utilized at one or both of the market POS 200 or gas station POS 30 to properly identify the customer. Furthermore, the barcode may have some form of embedded security identification information for authenticating the purchase. In other configurations, the peripheral interface board may not be required. Pertaining to the discounts, a variety of arrangements are contemplated. Some examples entail the funding of the discount or reward by third parties other than the supplier of petroleum. Other discounts are offered in the form of a club discount or volume discount. The controller utilized may be any type of hardware device with software programming to implement the intended functions.

Figure 11:
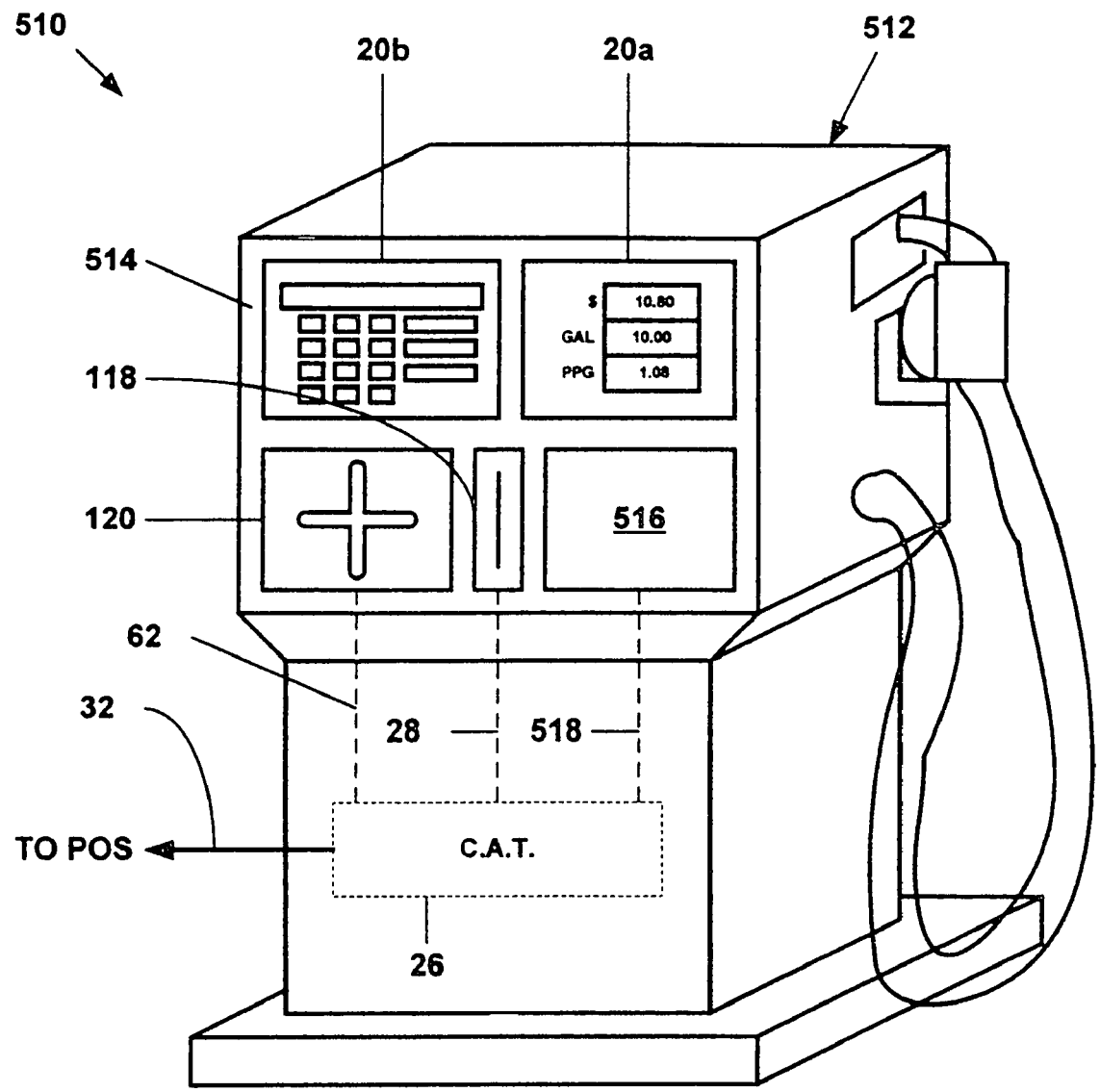
FIG. 11 is a diagram of another embodiment of a fuel dispenser system.

Referring to FIG. 11, the reference numeral 510 refers to a fuel dispenser system embodying features of another embodiment of the present invention. The fuel dispenser system 510 includes a fuel dispenser 512 connected to the computing center 30 and many components similar to those in the fuel dispenser systems 10 and 110 (FIGS. 1 and 5), such components being similarly numbered.

A front side 514 of the fuel dispenser houses the conventional graphics displays, 20a and 20b, (optionally) the conventional magnetic-strip-only reader device 118, and the scanning bar code reader 120. The front side 514 further houses a conventional currency accepting and change providing device 516 operably coupled to the CAT 26 by a conventional communications interface 518. As will be recognized by persons having ordinary skill in the art, the currency accepting and change providing device 516 permits a customer to purchase a product by inserting paper and/or coin currency into one or more openings in the device. Any change owed to the consumer is then provided by the currency accepting and change providing device 516 in the form of paper and/or coin currency. The design and operation of currency accepting and change providing devices 516 is considered well known.

Figure 12A:
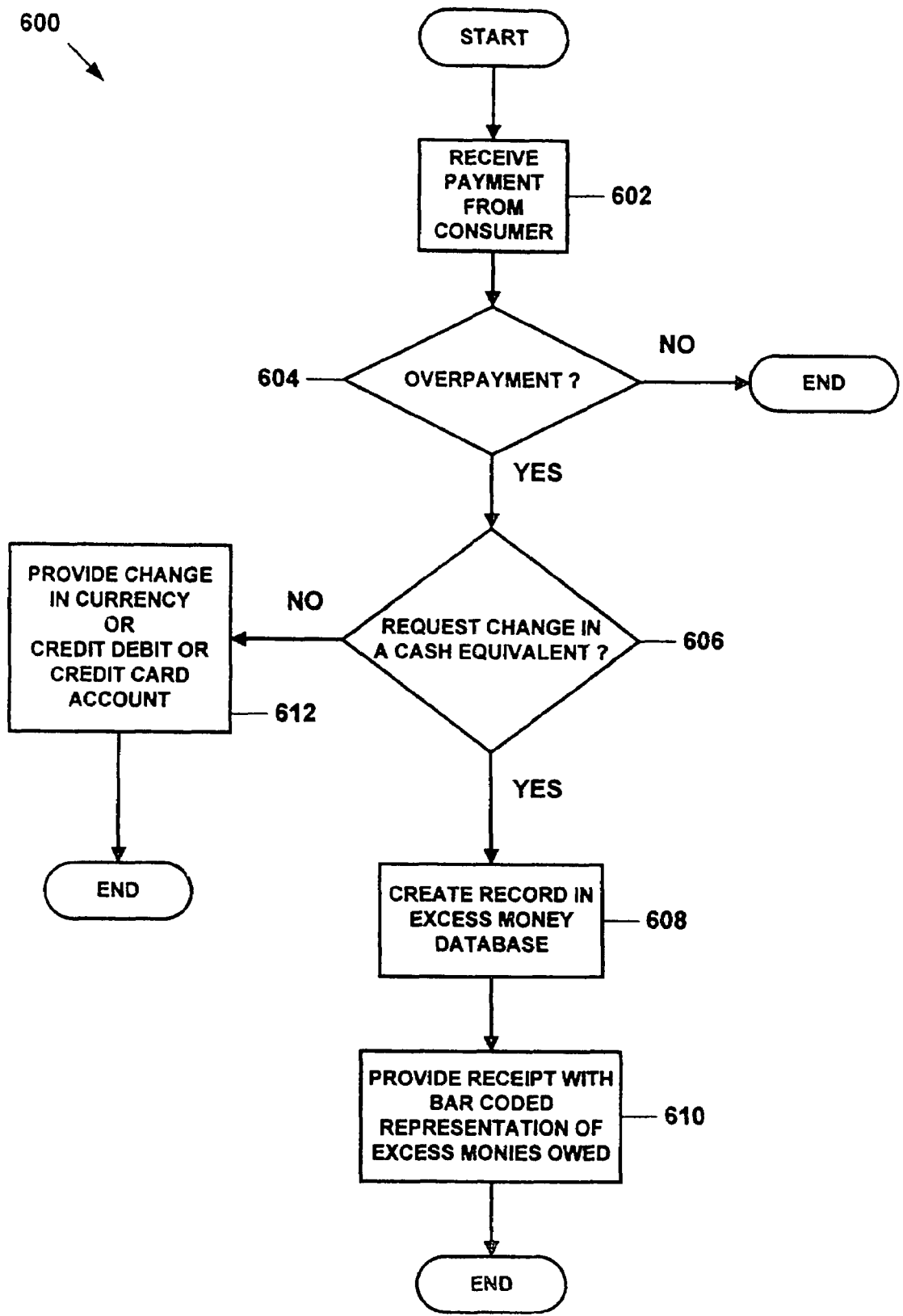
FIG. 12a is a flowchart of the process implemented by the present embodiments to permit a consumer to receive change in the form of a cash equivalent.
Figure 12B:
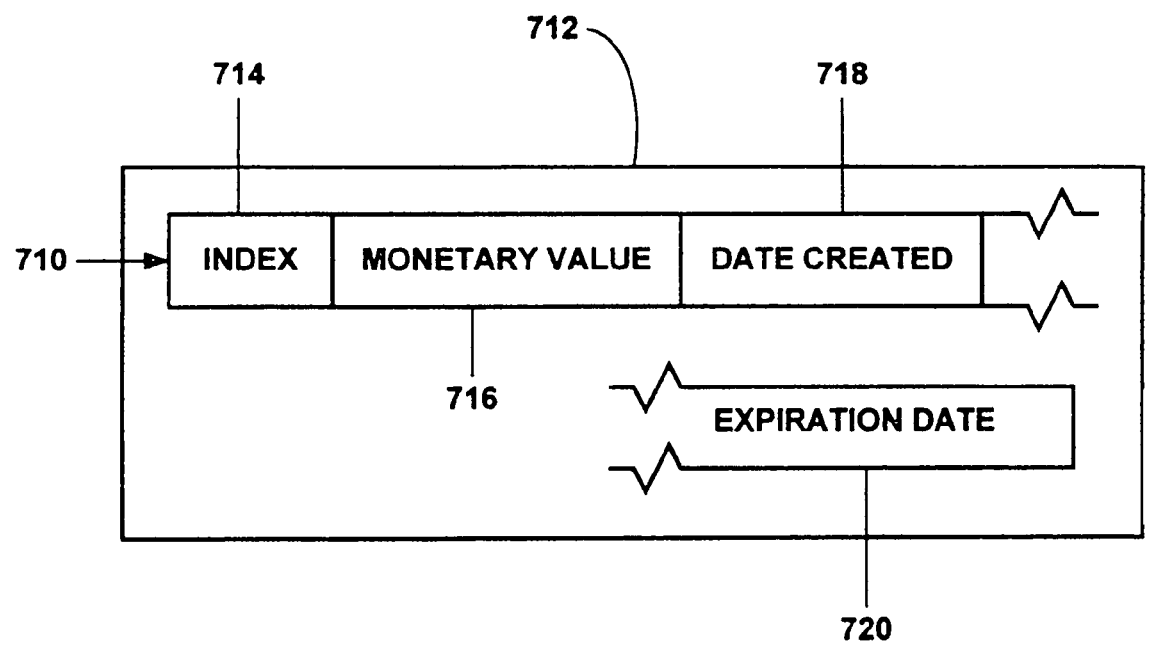
FIG. 12b is a diagram of an excess money database including records representative of change provided to consumers in the form of a cash equivalent.
Figure 12C:
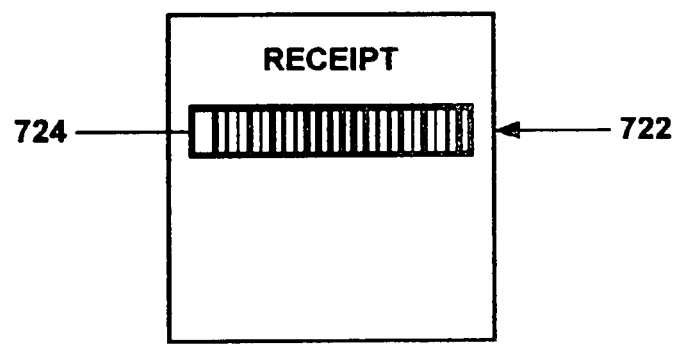
FIG. 12c is a diagram of a receipt provided to a consumer that provides change in the form of a cash equivalent.

In operation, a consumer may purchase fuel using currency, a magnetic strip credit or debit card, a bar coded card (similar to the bar coded card 80), or a bar coded receipt (similar to the receipt 130). Regardless of the mode of payment used by the consumer, the consumer can overpay for the dispensed fuel and request currency (or the functional equivalent) as change or request that the system credit their credit or debit card account. In particular, referring to FIGS. 12a-12c, the system 510 may implement a purchase process 600 in which the consumer may pay for the purchased fuel in step 602. If the consumer overpays for the purchased fuel in step 602, then the consumer may request that the system 510 credit their credit/debit card account, provide change in the form of currency, or provide change in the form of a currency equivalent in the form of a bar coded receipt in steps 604 and 606. If the consumer requests change in the form of a currency equivalent in step 606, then the system 510 generates a record 710 in an excess money database 712 that includes a record index 714, the monetary value 716 assigned to the record index, the date 718 the record was created, and a predetermined expiration date 720 for the record in step 608. The system 510 then prints out and provides the consumer with a bar coded receipt 722 that includes a bar coded representation 724 of the record index 714 in step 610. The consumer may then use the bar coded receipt 722 to purchase fuel using the system 510 prior to the expiration date 720 of the corresponding record 710. If the consumer does not request change in the form of a currency equivalent in step 606, then the system 510 provides change in the form of currency or credits the account of the corresponding credit or debit card in step 612. In this manner, the system 510 increases the number of purchases of fuel by the consumer since the cash equivalent must be used on a compatible system. As a result, consumer loyalty is enhanced thereby increasing profits for the operator of the fuel dispensing system 510.

More generally, the teachings of the system 510 may be utilized in a general fashion in any retail or wholesale business in order to permit consumers to overpay for goods and services and receive cash-equivalents as change. The cash-equivalents may then be used by the consumers to purchase goods and services at retail and wholesale establishments having compatible purchasing systems.

Furthermore, the cash-equivalent could be a bar coded receipt or a magnetic strip card that includes one or more index values 714 encoded onto the magnetic strip. The index values 714 encoded onto the magnetic strip can then be accessed in a random or sequential pattern to permit purchases of goods and services.

The present embodiments of the invention provide a number of advantages. For example, the present embodiments provide a system for dispensing fuel in which users may be provided change in the form of a cash equivalent. The cash equivalent may then be used by the user to purchase fuel using the system. The system further creates a database that includes a plurality of records having corresponding index and monetary values. The cash equivalents may then be provided in the form of a bar coded or magnetic representation of the corresponding records. In this manner, the present embodiments of the invention provide a cost efficient and commercially valuable system for enhancing the profitability of fuel dispensing systems by improving customer loyalty.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

The invention claimed is:

1. A computer-implemented method of providing an incentive for a customer to purchase non-fuel products or services at a store that sells the products or services and fuel, said method comprising:
   detecting that the customer purchased a number of non-fuel products or services in a first visit to the store;
   providing the customer with a first reward entitling the customer to a first amount of free fuel in exchange for purchasing the non-fuel products or services in the first visit;
   detecting that the customer purchased a number of non-fuel products or services in a second visit to the store;
   providing the customer with a second reward entitling the customer to a second amount of free fuel in exchange for purchasing the non-fuel products or services in the second visit;
   identifying the customer during a subsequent fueling transaction; and
   dispensing an amount of free fuel to the customer equal to the total of the first and second amounts of free fuel.

2. The method according to claim 1, wherein the first and second amounts of free fuel are equal amounts.

3. The method according to claim 1, wherein the first and second amounts of free fuel are different amounts.

4. The method according to claim 1, wherein the steps of providing the customer with first and second rewards include providing the customer with first and second reward receipts having bar coded data imprinted thereon, said bar coded data indicating the first and second amounts of free fuel;
   wherein the step of identifying the customer during a subsequent fueling transaction includes scanning the first and second reward receipts by a bar code reader at a fuel dispenser.

5. The method according to claim 1, wherein the steps of providing the customer with first and second rewards include storing the first and second rewards in a rewards database;
   wherein the step of identifying the customer during a subsequent fueling transaction includes identifying the customer based on one of:
      reading a magnetic strip on an identification card;
      reading a transmission from a transponder device identifying the customer; and
      obtaining a personal identification number from the customer.

6. The method according to claim 1, further comprising:
   reading a credit card inserted into a card reader at the dispenser;
   dispensing additional fuel to the customer; and
   charging the credit card only for the additional fuel dispensed.

7. A system for providing an incentive for a customer to purchase non-fuel products or services at a store that sells the products or services and fuel, said system comprising:
   means for detecting that the customer purchased a number of non-fuel products or services in a first visit to the store, and that the customer purchased a number of non-fuel products or services in a second visit to the store;
   means for providing the customer with a first reward entitling the customer to a first amount of free fuel in exchange for purchasing the non-fuel products or services in the first visit, and for providing the customer with a second reward entitling the customer to a second amount of free fuel in exchange for purchasing the non-fuel products or services in the second visit;
   means for identifying the customer during a subsequent fueling transaction; and
   means for dispensing an amount of free fuel to the customer equal to the total of the first and second amounts of free fuel.

8. The system according to claim 7, wherein the means for providing the customer with the first and second rewards provides the customer with first and second rewards entitling the customer to equal amounts of free fuel.

9. The system according to claim 7, wherein the means for providing the customer with the first and second rewards provides the customer with first and second rewards entitling the customer to different amounts of free fuel.

10. The system according to claim 7, wherein the means for providing the customer with the first and second rewards includes means for providing the customer with first and second reward receipts having bar coded data imprinted thereon, said bar coded data indicating the first and second amounts of free fuel;
   wherein the means for identifying the customer during a subsequent fueling transaction includes a bar code reader for reading the first and second reward receipts.

11. The system according to claim 10, wherein the bar code reader is implemented in a fuel dispenser.

12. The system according to claim 7, wherein the means for providing the customer with the first and second rewards includes a rewards database for storing the first and second rewards;

wherein the means for identifying the customer during a subsequent fueling transaction includes identifying means selected from a group consisting of:
- means for reading a magnetic strip on an identification card;
- means for reading a transmission from a transponder device identifying the customer; and
- means for obtaining a personal identification number from the customer.

13. The system according to claim 7, further comprising:
means for reading a credit card inserted into a card reader at the dispenser;
means responsive to reading the credit card for dispensing additional fuel to the customer; and
means for charging the credit card only for the additional fuel dispensed.

14. A computer-implemented method of providing an incentive for a customer to purchase non-fuel products or services at a first retail store, said method comprising:
- detecting that the customer purchased a number of non-fuel products or services in a first visit to the first retail store;
- providing the customer with a first reward entitling the customer to a first amount of free fuel in exchange for purchasing the non-fuel products or services in the first visit;
- detecting that the customer purchased a number of non-fuel products or services in a second visit to the first retail store;
- providing the customer with a second reward entitling the customer to a second amount of free fuel in exchange for purchasing the non-fuel products or services in the second visit;
- identifying the customer during a subsequent fueling transaction at a fueling station having a cross-marketing agreement with the retail store; and
- dispensing by the fueling station, an amount of free fuel to the customer equal to the total of the first and second amounts of free fuel.

15. The method according to claim 14, further comprising reimbursing the fueling station by the retail store for the amount of free fuel dispensed to the customer.

16. The method according to claim 14, wherein the steps of providing the customer with first and second rewards include storing the first and second rewards in a rewards database;
wherein the step of identifying the customer during a subsequent fueling transaction includes identifying the customer based on one of:
- reading a magnetic strip on an identification card;
- reading a transmission from a transponder device identifying the customer; and
- obtaining a personal identification number from the customer.

17. A computer-implemented method of providing an incentive for a customer to purchase non-fuel products or services at a plurality of retail stores, said method comprising:
- detecting that the customer purchased a number of non-fuel products or services in a visit to a first retail store;
- providing the customer with a first reward entitling the customer to a first amount of free fuel in exchange for purchasing the non-fuel products or services in the visit to the first retail store;
- detecting that the customer purchased a number of non-fuel products or services in a visit to a second retail store;
- providing the customer with a second reward entitling the customer to a second amount of free fuel in exchange for purchasing the non-fuel products or services in the visit to the second retail store;
- storing the first and second rewards in a rewards database;
- identifying the customer during a subsequent fueling transaction at a fueling station having a cross-marketing agreement with the first and second retail stores;
- retrieving the first and second rewards from the rewards database; and
- dispensing by the fueling station, an amount of free fuel to the customer equal to the total of the first and second amounts of free fuel.

18. The method according to claim 17, wherein the step of identifying the customer during a subsequent fueling transaction includes identifying the customer based on one of:
- reading a magnetic strip on an identification card;
- reading a transmission from a transponder device identifying the customer; and
- obtaining a personal identification number from the customer.

* * * * *